(12) United States Patent
Muñoz et al.

(10) Patent No.: US 12,481,048 B2
(45) Date of Patent: Nov. 25, 2025

(54) MULTI-STEP DIRECTION OF ARRIVAL ESTIMATION FOR IMAGING RADARS

(71) Applicant: GM Cruise Holdings LLC, San Francisco, CA (US)

(72) Inventors: Jorge Julio Jácome Muñoz, Ottobrunn (DE); Johanna Gütlein-Holzer, Ottobrunn (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 401 days.

(21) Appl. No.: 18/099,237

(22) Filed: Jan. 19, 2023

(65) Prior Publication Data

US 2024/0230871 A1 Jul. 11, 2024

(30) Foreign Application Priority Data

Jan. 5, 2023 (EP) ..................................... 23150482

(51) Int. Cl.
*G01S 13/42* (2006.01)
*G01S 7/03* (2006.01)
*G01S 13/89* (2006.01)
*G01S 13/931* (2020.01)

(52) U.S. Cl.
CPC ................ *G01S 13/42* (2013.01); *G01S 7/03* (2013.01); *G01S 13/89* (2013.01); *G01S 13/931* (2013.01)

(58) Field of Classification Search
CPC . G01S 13/42; G01S 7/03; G01S 13/89; G01S 13/931
See application file for complete search history.

(56) References Cited

U.S. PATENT DOCUMENTS

| 11,454,697 B2* | 9/2022 | Maher | G01S 7/352 |
| 2018/0166794 A1 | 6/2018 | Raphaeli et al. | |
| 2019/0115670 A1* | 4/2019 | Kishigami | G01S 13/284 |
| 2019/0310359 A1* | 10/2019 | Lee | G01S 13/0218 |

(Continued)

FOREIGN PATENT DOCUMENTS

| CN | 109557502 B | 9/2022 |
| EP | 4030191 A2 | 7/2022 |

OTHER PUBLICATIONS

"Extended European Search Report for European Patent Application No. 23150482.0", Mailed Date: Aug. 14, 2023, 13 pages.

*Primary Examiner* — Bernarr E Gregory
*Assistant Examiner* — Nazra Nur Waheed
(74) *Attorney, Agent, or Firm* — CANTOR COLBURN LLP

(57) ABSTRACT

Technologies described herein relate to a multi-step direction of arrival estimation for imaging radars. A radar system includes X transmitter antennas that output radar signals into an environment and Y receiver antennas that generate detection signals based upon the receiving radar signals output by the transmitter antennas. The system separates the detection signals into N virtual receivers that generate a data cube. The system extracts first values from the data cube that correspond to a first set of virtual receivers and computes a first direction of arrival with respect to a target in the environment based on the first values. The system then computes a second direction of arrival with respect to the target in the environment, that is based upon the first direction of arrival and second values in the data cube that correspond to a second set of virtual receivers.

20 Claims, 7 Drawing Sheets

(56) References Cited

U.S. PATENT DOCUMENTS

| | | | |
|---|---|---|---|
| 2021/0116531 A1* | 4/2021 | Shabtay | G06F 18/2431 |
| 2022/0214425 A1* | 7/2022 | Yoffe | G01S 13/584 |
| 2023/0131090 A1* | 4/2023 | Li | G01S 13/58 |
| | | | 342/130 |

* cited by examiner

MULTI-STEP DIRECTION OF ARRIVAL ESTIMATION FOR IMAGING RADARS

RELATED APPLICATION

This application claims priority to European Patent Application No. EP23150482.0, filed on Jan. 5, 2023, and entitled "MULTI-STEP DIRECTION OF ARRIVAL ESTIMATION FOR IMAGING RADARS", the entirety of which is incorporated herein by reference.

BACKGROUND

Conventionally, in a radar system with multiple receivers, there is significant computational complexity required to compute direction of arrival for a radar return. For example, with respect to a transmitter that emits a radar signal into an environment, such signal is transmitted over a certain portion of the environment. For instance, the portion of the environment includes an object. The radar signal reflects from the object, and the reflected signal is detected by numerous receiver antennas. In a specific example, the field of view of an antenna apparatus (that includes 400 receivers) is 60 degrees, and one degree of resolution is desired. Each angular degree in the field of view needs to be processed for each signal detected by the receiver. Accordingly, using conventional approaches, 24,000 scans (60 degrees×400 receivers) are necessary. Moreover, a full resolution scan requires analyzing all angles relative both to elevation and azimuth. That many scans would require an inordinate amount of processing power for typical applications. Conventional approaches developed to overcome this processing problem have deficiencies, including: 1) the conventional approaches require particular spacing between receiver antennas, thus limiting flexibility in size and shape of an antenna; 2) the receivers must be arranged in a grid; 3) the antenna that includes the receivers has a fixed field of view (meaning that beamforming cannot reasonably be used to alter the field of view); and 4) conventional approaches can result in undesirable sidelobe levels.

Thus, existing radar system are known to have a high computation cost for estimating two-dimensional fine angular direction of arrival, including for both conventional beamformers and parametric methods such as multiple signal classification (MUSIC), estimating signal parameters via rotational invariance techniques (ESPRIT), and compressive sensing (CS). In conventional imaging radars based on Fast-Fourier Transform (FFT) beamformers, a semi-uniform spacing is required between sensing elements. As such, known FFT-based beamformers have a uniform grid and a fixed field of view, which limits flexibility in terms of the potential regions of interest for environmental perception in applications such as autonomous vehicles (AVs), drones, watercraft, and so forth. FFT-based beamformers are thus required to choose between high resolution and sidelobe level control (due to linear windowing), which can be especially detrimental when separating closely-spaced objects at an angle.

SUMMARY

The following is a brief summary of subject matter that is described in greater detail herein. This summary is not intended to be limiting as to scope of the claims.

In view of the foregoing, there is a need for radar system that is able to obtain more precise estimations of the positions of environmental objects without the typical associated drawback of high computational cost. Embodiments as disclosed herein generally overcome this problem through a novel and flexible arrangement and use of different subsets of virtual receivers through modulation, multiplexing and antenna placement. Accordingly, the embodiments herein provide unambiguous two-dimensional direction of arrival estimation of radar signals based on complimentary subarrays, which significantly reduces computational cost.

A radar system described herein is a multi-input multi-output (MIMO) radar system that effectively creates a virtual array of N×M receive channels, where N is a number of physical transmitter antennas and M is a number of physical receiver antennas. There need be no strict requirements on spacing between antenna elements, which can be arranged in one dimension or two dimensions. For example, if there are 10 transmitting antennas (N=10) and 20 receiving antennas (M=20) there will be a resulting virtual array having 200 (10×20) receive channels.

In connection with reducing computational effort, a subset of these 200 receive channels are selected (for example, based upon knowledge regarding lack of self-interference, placement of the physical antennas, etc.). For purposes of example, virtual receivers 1-10 from virtual receivers 1-200 are selected. These virtual receivers can be selected by a designer of the radar antenna system. In other embodiments, a set of physical receivers can be selected. During a radar scan (where the transmitters have emitted signals into the environment and they have reflected and been detected by the receivers), the signals associated with the 200 virtual receivers are used to generate a data cube that includes 200 range-Doppler maps (one for each channel). As is known, a range-Doppler map is a frequency domain structure that includes unitless values that correspond to certain range gates and Doppler gates.

Once a data cube is generated, instead of using data from all of the range-Doppler maps (as is undertaken using conventional approaches), the radar system selects range-Doppler maps that correspond to the predefined virtual receivers (e.g., virtual receivers 1-10). Thereafter, the radar system performs beamforming using known processes (e.g., coherent integration, detection, and region of interest extraction) to estimate a position of a target in elevation and azimuth. For instance, the radar system can calculate that the target is at about 45 degrees in azimuth. The system can then use the remaining range-Doppler maps to refine the estimate; for instance, instead of searching through all degrees 0-60, as the radar system has determined that the target is at about 45 degrees in azimuth, the radar system can search through degrees 40-50 to compute an azimuth value for the target. In other words, the (albeit low-resolution) estimate can be used to significantly narrow the scope of the data needed to compute the (higher resolution) positional information, the system can output detections with angle of arrival information in multiple dimensions at significantly reduced computational cost. The narrowed processing scope also provides a higher signal-to-noise ratio (SNR), which improves the accuracy of object detection. This process can be further improved by assigning different frequency bands to the different sets of virtual receivers.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
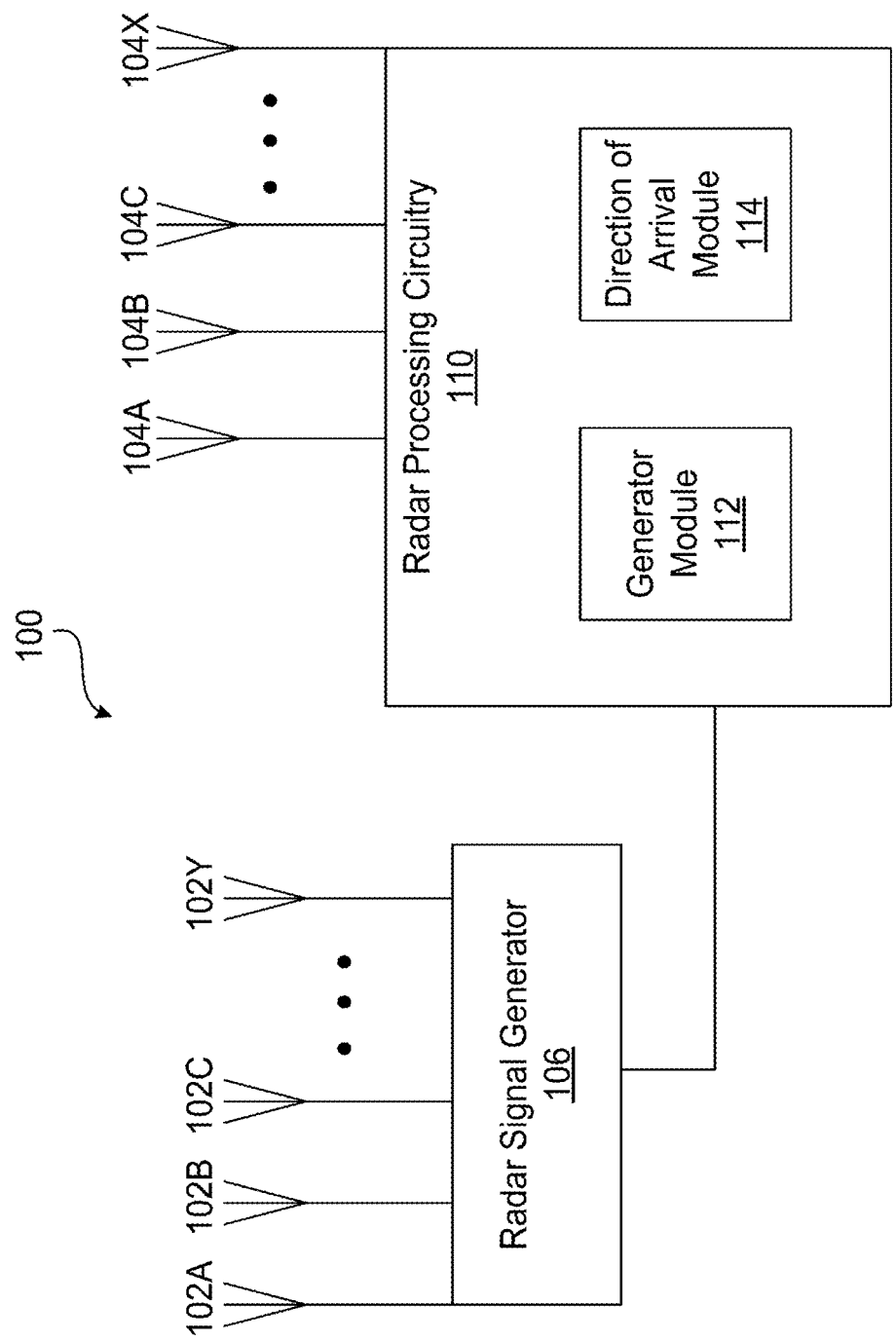
FIG. 1 is a functional block diagram of a radar system.

Various technologies pertaining to a MIMO radar system are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system modules may be performed by multiple modules. Similarly, for instance, a module may be configured to perform functionality that is described as being carried out by multiple modules.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

FIG. 1 is a functional block diagram of a radar system 100. The radar system 100 includes X transmitting antennas 102A-102X (transmitters) and Y receiving antennas 104A-104Y (receivers). The transmitters 102 and receivers 104 are configured for transmission and receipt, respectively, of radar signals. Due to the nature of the disclosed system, the transmitters and receivers are not subjected to strict positional and spacing requirements. Thus, in an example, the receivers and/or transmitters are not uniformly spaced in relation to one another. In another example, the antennas are arranged in a pattern that is other than a grid pattern (arranged to conform to a space). The transmitters 102 belong to a transmit chain that includes a radar signal generator 106. The radar signal generator 106 may be or include, for example, a digital signal processor (DSP), a digital to analog converter (DAC), an amplifier, one or more filters, etc. In operation, the signal generator 106 provides electrical signals to the transmitters 102, which emit radar signals into an environment of the radar system 100 based upon the electrical signals.

The receivers are included in a receive chain, where the receive chain also includes radar processing circuitry 110. The radar processing circuitry 110 comprises circuitry and/or software, where the circuitry and/or software includes a generator module 112 that generates a data cube and a direction of arrival module 114 that determines an estimated direction of arrival for a detected radar signal as described herein. The radar processing circuitry 110 may include an analog-to-digital converter (ADC) to convert analog electrical signals output by the receivers into digital signals, an amplifier, a filter, a DSP (or other processing device) that performs signal processing, etc. In some embodiments, as shown in FIG. 1, the radar signal generator 106 and radar processing circuitry are in data communication.

Figure 2A:
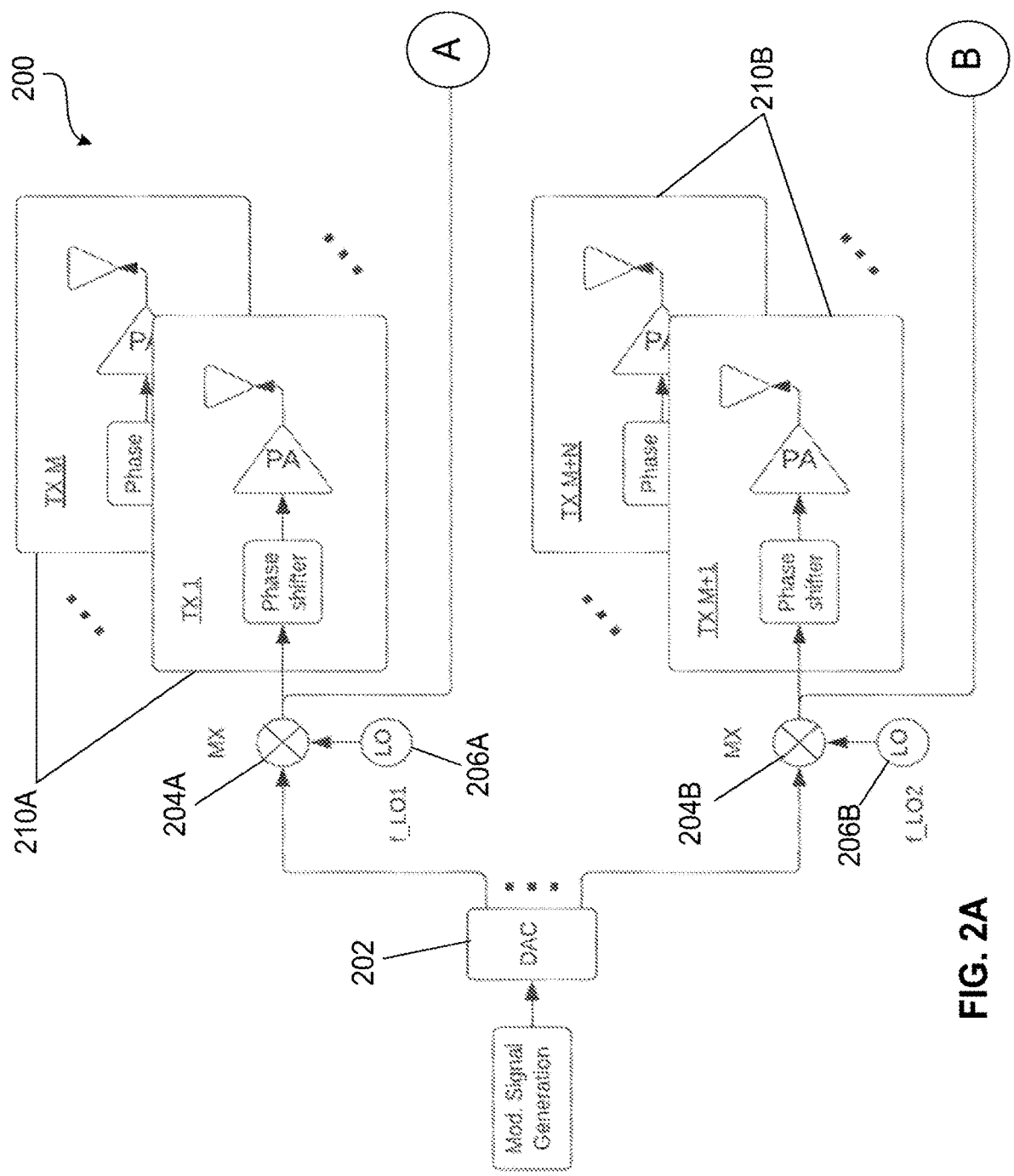
FIGS. 2A and 2B are functional block diagrams of portions of a radar system.
Figure 2B:
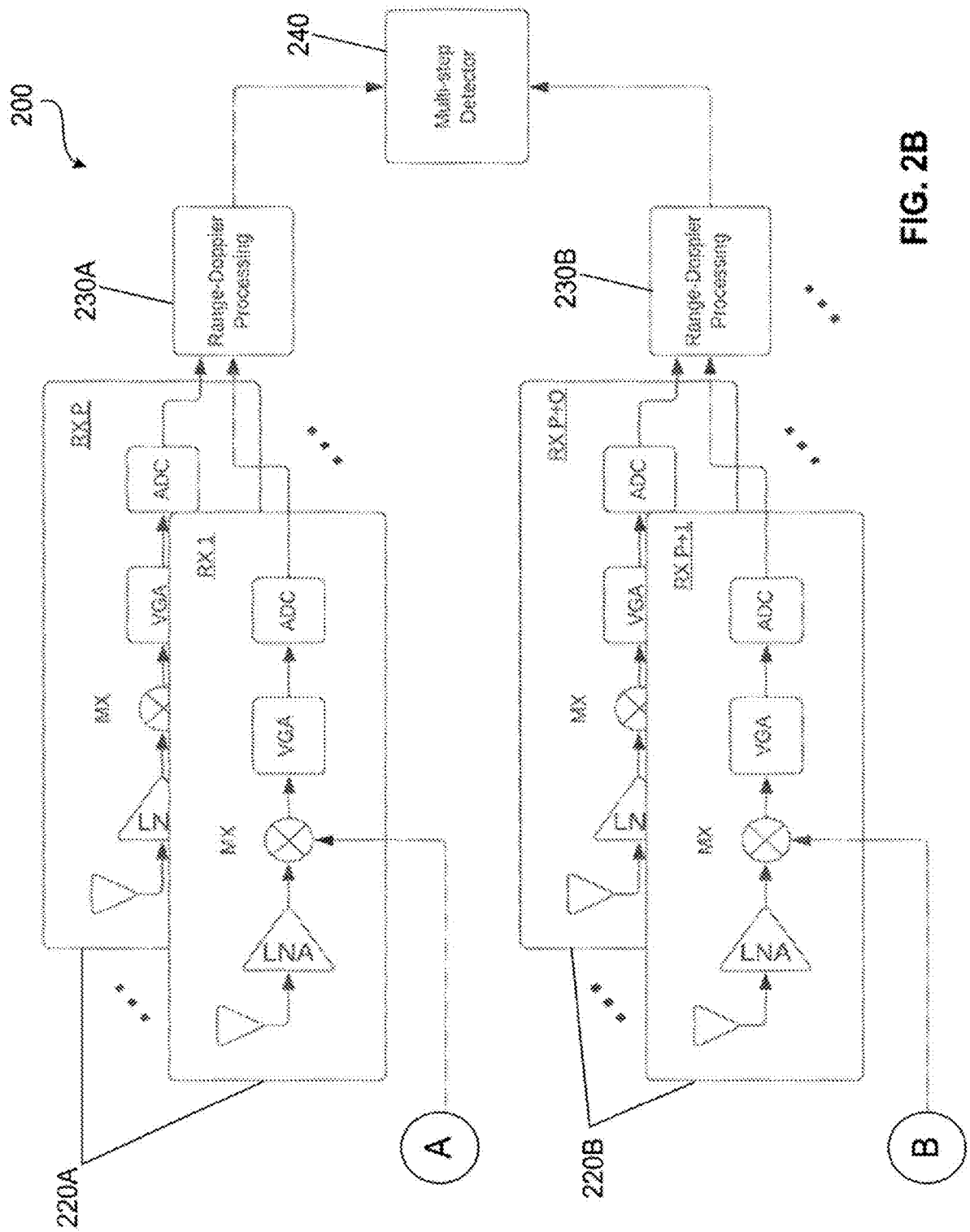

FIGS. 2A and 2B depict a first radar system 200. The first radar system 200 is a linear frequency modulated continuous wave (LFMCW) radar system. The radar system 200 includes a digital-to-analog (DAC) converter 202 that converts an input modulated (digital) electrical signal (e.g., a chirp at a baseband frequency at, for example 0-1 or 0-4 GHz) to an analog signal. The analog signal is transmitted to one or more sets of mixers 204A and 204B, each coupled to a local oscillator 206A and 206B that upconverts the signals into a desired frequency band. The separate branches A and B of the system represent radar signals being transmitted and received in different frequency bands. The exemplary system 200 depicts two distinct bands, but it should be understood that there could be one band or more than two bands. The radar system 200 further includes a plurality of sets of transmitter circuitry 210A and 210B. The transmitter circuitry 210A and 210B in the exemplary embodiment each include a phase shifter, an amplifier and an antenna.

The first radar system 200 further includes one or more sets of receiver circuitry 220A and 220B. Each of the receiver circuitry includes an antenna coupled to a low-noise amplifier. The amplifier is coupled to a mixer that receives as input the output of a respective mixer 204A or 204B from the transmitter side, and performs down-conversion/down-chirping. The receiving mixer outputs to a chain of filters and variable gain amplifiers for signal conditioning back to the baseband frequency and then to an ADC to convert the signal to a digital signal. The digital outputs of the respective sets receiver circuitry 220A and 220B coupled to respective range-Doppler processing units 230A and 230B, which generate a data cube. Specifically, the range-Doppler processing unit 230A generates a first data cube for the frequency band A while the range-Doppler processing unit 230B generates a second data cube for the frequency band B. While FIG. 2B depicts two range-Doppler processors 230A and 230B, these may in fact be two uses of one physical range-Doppler processor. The output of the range-Doppler processor(s) 230A and 230B are provided to a multi-step detector 240 that estimates direction of arrival as described herein.

Figure 3A:
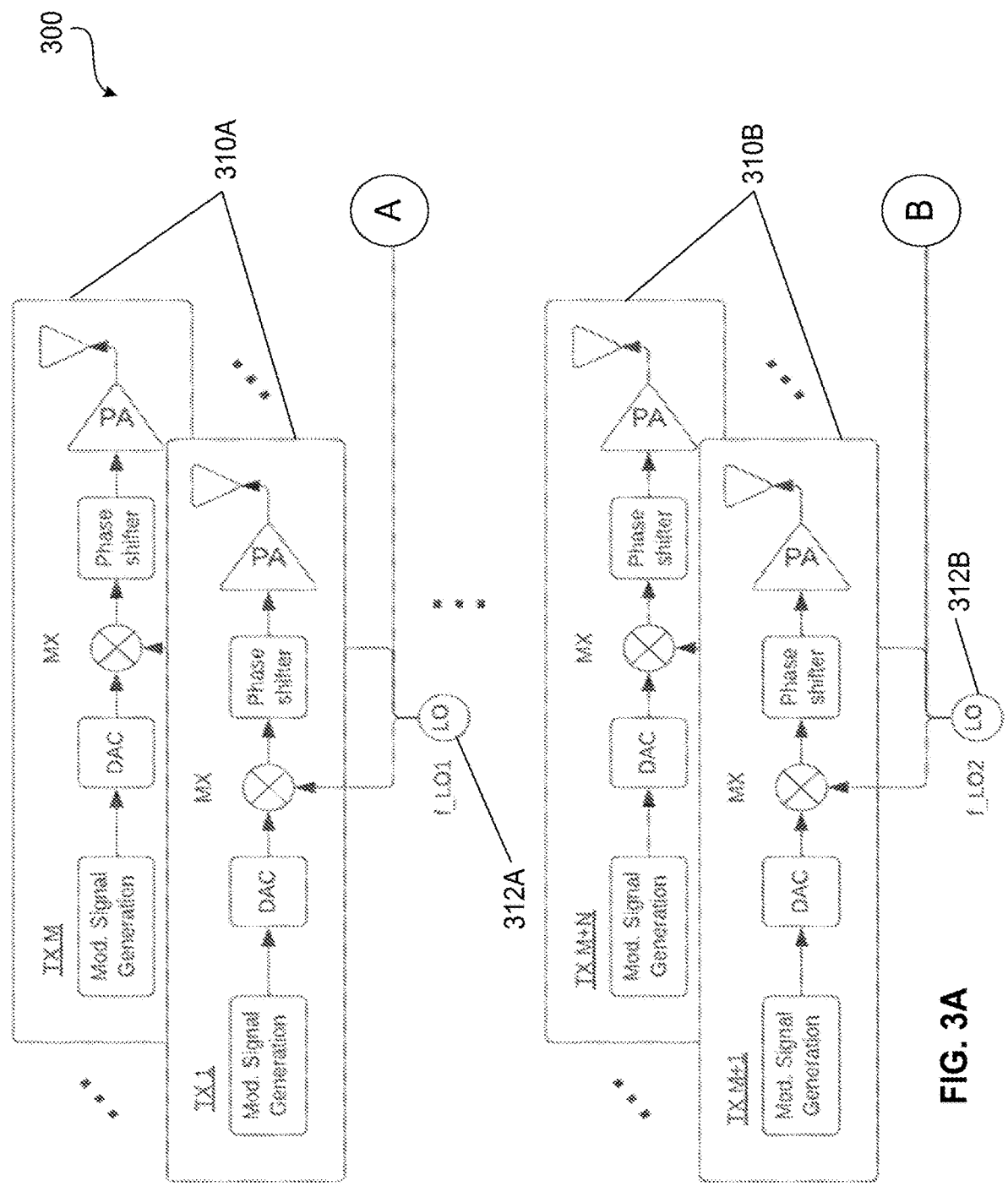
FIGS. 3A and 3B are functional block diagrams of portions of another radar system.
Figure 3B:
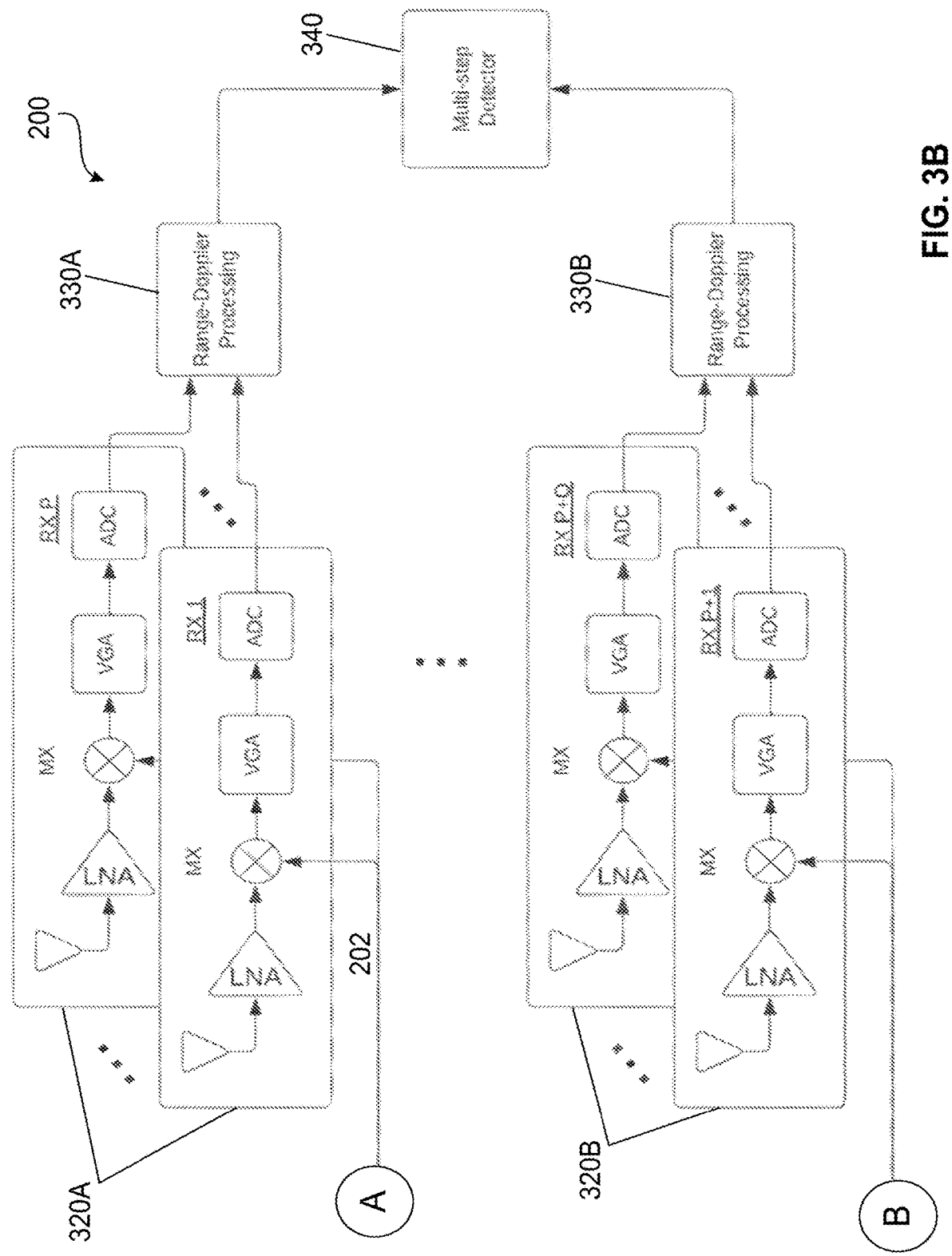

FIGS. 3A and 3B are functional block diagrams of another radar system 300. The radar system 300 can be included in, for example, a frequency modulated continuous wave (FMCW) radar system, a pulse modulated continuous wave (PMCW) radar system, or an orthogonal frequency-division multiplexing (OFDM) radar system. The radar system 300 includes a plurality of sets of transmitter circuitry 310A and 310B. The separate branches A and B of the system 300 represent radar signals being transmitted and received in different frequency bands (bands A and B) as described above with respect to the system 200. The transmitter circuitry 310A and 310B illustrated in FIG. 3A each include an input modulated radar signal generator similar to the one described above (which may be common to all transmitting antennas) coupled to a DAC. The DAC is coupled to a mixer that receives input also from respective common local oscillator 312A or 312B to upconvert the signal from the baseband frequency. The output of the mixer is coupled to a phase shifter, which is in turn coupled to a power amplifier and then antenna.

The radar system 300 further includes one or more sets of receiver circuitry 320A and 320B. Each of the receiver circuitry 320A and 320B include an antenna coupled to a low-noise amplifier. The amplifier is coupled to a mixer that receives a carrier frequency from respective common local oscillator 312A or 312B. The mixer downconverts the signal and outputs to a chain of filters and variable gain amplifiers that condition the signal for baseband processing and then output to an ADC that converts the signal to a digital signal. The digital outputs of the respective sets of receiver circuitry 320A and 320B are coupled to respective range-Doppler processing units 330A and 330B, which generate data cubes (e.g., range-Doppler maps for each channel). While FIG. 3B depicts two range-Doppler processors 330A and 330B, the radar system 300 can include a single range-Doppler processor or more than two range-Doppler processors. The output of the range-Doppler processor(s) 330A and 330B and coupled to a multi-step detector 340 that estimates direction of arrival as described herein.

Figure 4:
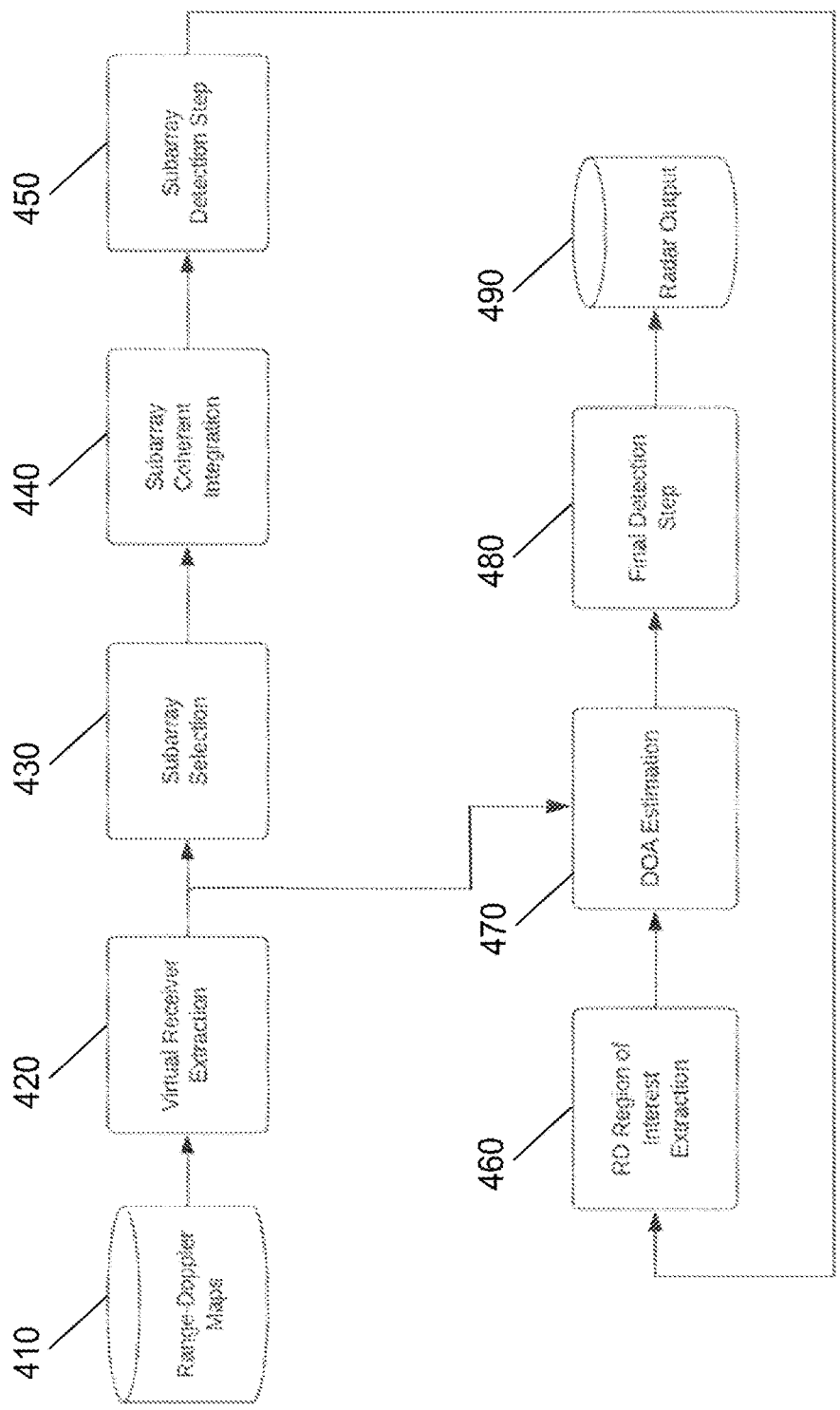
FIG. 4 is a schematic that depicts signal processing to compute an angle of arrival of a reflected radar signal.

FIG. 4 depicts an exemplary signal processing diagram illustrating the flow of data in a radar system according to the present disclosure. For exemplary purposes with reference to the diagram of FIG. 4, a radar system can have 10 physical transmitters, 40 physical receivers, and a field of detection having 100 degrees in azimuth and 20 degrees in elevation, for 2,000 total directions. At 410, a data cube of "stacked" range-doppler maps are stored in memory, where the data cube includes a layer for each channel (e.g., each virtual receiver). The cells of the data cube have unitless values that can be used to detect locations and velocities of objects in the environment. In the present example, the data cube includes 400 layers, with each layer having 2000 cells that correspond to range and Doppler gates (and thus magnitude and phase information).

At 420, virtual receiver extraction is undertaken; virtual receiver extraction results in the layers of the data cube being separately identifiable (e.g., layer 1 of the data cube corresponds to a first virtual receiver, layer 2 of the data cube corresponds to a second virtual receiver, and so forth). Put differently, virtual receiver extraction allows for data in the data cube that corresponds to one virtual receiver to be separated from data in the data cube that corresponds to other virtual receivers.

After virtual receiver extraction, at 430, subarray selection is performed. Subarray selection refers to obtaining data that corresponds to a predefined set of virtual receivers. The predefined set of virtual receivers can be selected based upon lack of interference empirically identified for the set of virtual receivers, position of physical receivers (that correspond to the virtual receivers) in an array, etc.

At 440, coherent integration is performed with respect to the data obtained from the predefined set of virtual signals to form processed signals. Coherent integration is performed to, for example, improve SNR. At 450, targets (if any) in the environment are detected based upon the processed signals.

At 460, regions of interest in the data cube are then determined based on the detected targets. As noted above, in this example, a resolution of an angle of arrival is one degree in azimuth and one degree in elevation. In stage 460, a rough estimate (e.g., +/−5 degrees in azimuth and elevation) of the angle of arrival can be computed.

At 470, direction of arrival for the signal is estimated based upon the region of interest determined at 460. Because a rough estimate was computed at 460, it can be ascertained that only a portion of the data cube is needed to compute the angle of arrival with the desired resolution, rather than the entire data cube. At 470, portions of the data cube corresponding to the region of interest from virtual receivers other than the subset identified at stage 430 can be obtained and used to estimate the direction of arrival. In another example, portions of the data cube corresponding to the region of interest from all virtual receivers can be obtained and used to estimate the direction of arrival. Because only a portion of the data cube is used to compute the direction of arrival, computing resources (e.g., computing cycles) needed to compute the angle of arrival can be reduced. After direction of arrival is estimated, the result is then processed at 480 using known techniques to detect an object in the environment. Finally, the object detection is output to memory at 490.

Advantages of the aspects described herein can be ascertained when considering the example set forth above. As noted previously, the radar system can include 400 virtual receivers and 2000 potential direction of arrival angles. Searching the data cube for the direction of arrival across all of the data in the data cube is computationally expensive. The technologies described herein narrows the scope of the search by computing a rough estimate and then using data in the data cube that corresponds to that rough estimate. This allows for a relatively large reduction in computing resources needed to compute the direction of arrival at a desired resolution.

Figure 5:
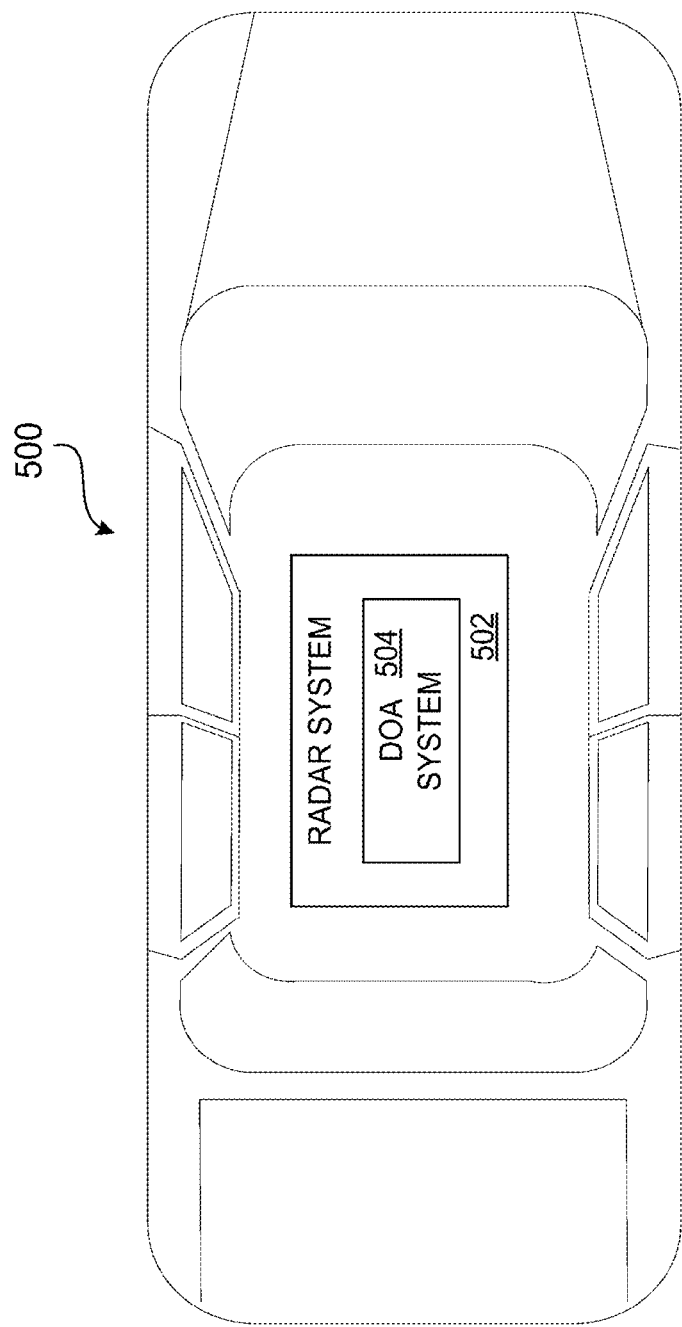
FIG. 5 illustrates an exemplary autonomous vehicle.

Referring to FIG. 5, an autonomous vehicle (AV) 500 is depicted. In an example, the AV 500 is a level 5 AV. The AV 500 includes a radar system 502. The radar system 502 includes a direction of arrival (DOA) system 504, which estimates DOAs corresponding to targets in the environment of the AV 500. The DOA system 504 can employ the processing stages described with respect to FIG. 4. While not illustrated, the AV 500 also includes a computing system that executes a control system, where the control system receives output from the radar system 502 and controls a module of the AV 500 based upon the output from the radar system 502. The module of the AV 500 can be a steering system, a braking system, a propulsion system (e.g., a combustion engine or an electric motor), and the like. Specifically, the control system can control the module of the AV 500 based upon the DOA computed by the DOA system 504.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium.

Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Described herein are technologies that pertain to the examples set forth below.

(A1) In an aspect, a method for estimating direction of arrival in a MIMO radar system includes generating a data cube having a plurality of cells, each cell representing directional radar data from one of a plurality of virtual receivers. The method also includes selecting a first subset of the plurality virtual receivers and generating a preliminary estimate of direction of arrival based on directional radar data from the first subset of the plurality virtual receivers. The method further includes using the preliminary estimate of direction of arrival to determine a region of interest within the directional radar data in the cells of the virtual cube. The method additionally includes estimating direction of arrival using the directional radar data within the region of interest of cells of the data cube associated with a second set of virtual receivers.

(A2) In some embodiments of the method of (A1), the second set of virtual receivers comprise the plurality of virtual receivers.

(A3) In some embodiments of the method of (A1), the second set of virtual receivers are virtual receivers except the first set of virtual receivers.

(A4) In some embodiments method of (A1), the second set of virtual receivers includes at least one virtual receiver of the first set of virtual receivers.

(A5) In some embodiments of at least one of the methods of (A1)-(A4), the preliminary estimate of direction of arrival and the estimate of direction of arrival each represent two dimensions.

(A6) In some embodiments of at least one of the methods of (A1)-(A5), the first set of virtual receivers corresponds to signals received in a first frequency band and the second set of virtual receivers corresponds to signals received in a second, different frequency band.

(B1) In another aspect, a method for estimating direction of arrival in a MIMO radar system is disclosed. The MIMO radar system has X transmitter antennas, wherein X is greater than one, and further where the X transmitter antennas output radar signals into an environment. The MIMO radar system also includes Y receiver antennas, where Y is greater than one, and further where the Y receiver antennas generate detection signals based upon the receiving radar signals output by the X transmitter antennas. The method includes separating the detection signals into N signals that correspond to N virtual receivers, where the N virtual receivers include a first set and a second set, wherein the first set and the second set are different from one another. The method also includes generating a data cube based upon the N signals and extracting first values from the data cube that respectively correspond to the first set of virtual receivers. The method further includes computing a preliminary direction of arrival with respect to a target in the environment, where the preliminary direction of arrival is based upon the first values extracted from the data cube. The method also includes computing a direction of arrival with respect to the target in the environment, where the direction of arrival is computed based upon the preliminary direction of arrival and second values in the data cube that respectively correspond to the second set of virtual receivers, where the direction of arrival is a refinement of the preliminary direction of arrival.

(B2) In some embodiments of the method of (B1), the preliminary direction of arrival and the direction of arrival each represent two dimensions.

(B3) In some embodiments of the method of at least one of (B1)-(B2), the Y receiver antennas are arranged in a one-dimensional array.

(B4) In some embodiments of the method of at least one of (B1)-(B2), the Y receiver antennas are arranged in a two-dimensional array.

(B5) In some embodiments of the method of at least one of (B1)-(B4), the first set of virtual receivers and second set of virtual receivers share at least one virtual receiver.

(B6) In some embodiments of the method of at least one of (B1)-(B4), the first set of virtual receivers and second set of virtual receivers are mutually exclusive.

(B7) In some embodiments of the method of at least one of (B1)-(B6), the first set of virtual receivers corresponds to signals received in a first frequency band and the second set of virtual receivers corresponds to signals received in a second, different frequency band.

(C1) In another aspect, a method performed by a MIMO system is disclosed herein. The MIMO system includes X transmitter antennas, where X is greater than or equal to one, and further where the X transmitter antennas output radar signals into an environment. The MIMO system also includes Y receiver antennas, where Y is greater than one, and further where the Y receiver antennas generate detection signals based upon the receiving radar signals output by the X transmitter antennas. The method includes separating the detection signals into N signals that correspond to N virtual receivers, where the N virtual receivers include a first set and a second set, wherein the first set and the second set are different from one another, and further where $N=X \times Y$. The method also includes generating a data cube based upon the N signals and extracting first values from the data cube that respectively correspond to the first set of virtual receivers. The method further includes computing a first direction of arrival with respect to a target in the environment, where the first direction of arrival is based upon the first values extracted from the data cube. The method additionally includes computing a second direction of arrival with respect to the target in the environment, where the second direction of arrival is computed based upon the first direction of arrival and second values in the data cube that respectively correspond to the second set of virtual receivers, and further where the second direction of arrival is a refinement of the first direction of arrival.

(C2) In some embodiments of the method of (C1), the first direction of arrival and the second direction of arrival are in two dimensions.

(C3) In some embodiments of the method of at least one of (C1)-(C2), the Y receiver antennas are arranged in a one-dimensional array.

(C4) In some embodiments of the method of at least one of (C1)-(C2), the Y receiver antennas are arranged in a two-dimensional array.

(C5) In some embodiments of the method of at least one of (C1)-(C4), the first set of virtual receivers and second set of virtual receivers share at least one virtual receiver.

(C6) In some embodiments of the method of at least one of (C1)-(C4), the first set of virtual receivers and second set of virtual receivers are mutually exclusive.

(C7) In some embodiments of the method of at least one of (C1)-(C6), the first set of virtual receivers correspond to signals received in a first frequency band and the second set of virtual receivers corresponds to signals received in a second, different frequency band.

(D1) In yet another aspect, a MIMO radar system is disclosed herein, where the radar system is configured to perform any of the methods described herein (e.g., any of the methods of (A1)-(A6), (B1)-(B7), or (C1)-(C7)).

(E1) In still yet another aspect, processing circuitry of a MIMO radar system is disclosed herein, where the processing circuitry is configured to perform any of the methods described herein (e.g., any of the methods of (A1)-(A6), (B1)-(B7), or (C1)-(C7)).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A multi-input multi-output (MIMO) radar system comprising:

X transmitter antennas, wherein X is greater than or equal to one, and further wherein the X transmitter antennas output radar signals into an environment;

Y receiver antennas, where Y is greater than one, and further wherein the Y receiver antennas generate detection signals based upon receiving the radar signals output by the X transmitter antennas;

processing circuitry that is in communication with the Y receiver antennas, where the processing circuitry is configured to perform acts comprising:

separating the detection signals into N signals that correspond to N virtual receivers, where the N virtual receivers include a first set of virtual receivers and a second set of virtual receivers, wherein the first set of virtual receivers and the second set of virtual receivers are different from one another, and further wherein $N=X\times Y$;

generating a data cube based upon the N signals;

selecting the first set of virtual receivers based upon empirically identifying an absence of self-interference for the first set of virtual receivers;

extracting first values from a portion of the data cube using a first resolution applied to the data cube, wherein the first values extracted from the portion of the data cube respectively correspond to the first set of virtual receivers;

computing a first direction of arrival with respect to a target in the environment, where the first direction of arrival is based upon the first values extracted from the data cube;

applying a second resolution different from the first resolution to the portion of the data cube, without applying the second resolution to an entirety of the data cube;

extracting second values from the portion of the data cube using the second resolution applied to the portion of the data cube, wherein the second values extracted from the portion of the data cube respectively correspond to the second set of virtual receivers; and computing a second direction of arrival with respect to the target in the environment, where the second direction of arrival is computed based upon the first direction of arrival and the second values extracted from the portion of the data cube, where the second direction of arrival is a refinement of the first direction of arrival.

2. The MIMO radar system of claim 1, wherein the first direction of arrival and the second direction of arrival are in two dimensions.

3. The MIMO radar system of claim 1, wherein the Y receiver antennas are arranged in a one-dimensional array.

4. The MIMO radar system of claim 1, wherein the Y receiver antennas are arranged in a two-dimensional array.

5. The MIMO radar system of claim 1, wherein the first set of virtual receivers and the second set of virtual receivers share at least one virtual receiver.

6. The MIMO radar system of claim 1, wherein the first set of virtual receivers and the second set of virtual receivers are mutually exclusive.

7. The MIMO radar system of claim 1, wherein:

the first set of virtual receivers correspond to signals received in a first frequency band; and the second set of virtual receivers corresponds to signals received in a second, different frequency band.

8. A method for estimating direction of arrival in a MIMO radar system, the MIMO radar system having X transmitter antennas, wherein X is greater than one, and further wherein the X transmitter antennas output radar signals into an environment, and having Y receiver antennas, where Y is greater than one, and further wherein the Y receiver antennas generate detection signals based upon receiving the radar signals output by the X transmitter antennas, the method comprising:
  separating the detection signals into N signals that correspond to N virtual receivers, where the N virtual receivers include a first set of virtual receivers and a second set of virtual receivers, wherein the first set of virtual receivers and the second set of virtual receivers are different from one another;
  generating a data cube based upon the N signals;
  selecting the first set of virtual receivers based upon empirically identifying an absence of self-interference for the first set of virtual receivers;
  extracting first values from a portion of the data cube using a first resolution applied to the data cube, wherein the first values extracted from the portion of the data cube respectively correspond to the first set of virtual receivers;
  computing a preliminary direction of arrival with respect to a target in the environment, where the preliminary direction of arrival is based upon the first values extracted from the data cube;
  applying a second resolution different from the first resolution to the portion of the data cube, without applying the second resolution to an entirety of the data cube;
  extracting second values from the portion of the data cube using the second resolution applied to the portion of the data cube, wherein the second values extracted from the portion of the data cube respectively correspond to the second set of virtual receivers; and
  computing a direction of arrival with respect to the target in the environment, where the direction of arrival is computed based upon the preliminary direction of arrival and the second values extracted from the portion of the data cube, where the direction of arrival is a refinement of the preliminary direction of arrival.

9. The method of claim 8, wherein the preliminary direction of arrival and the direction of arrival each represent two dimensions.

10. The method of claim 8, wherein the Y receiver antennas are arranged in a one-dimensional array.

11. The method of claim 8, wherein the Y receiver antennas are arranged in a two-dimensional array.

12. The method of claim 8, wherein the first set of virtual receivers and second set of virtual receivers share at least one virtual receiver.

13. The method of claim 8, wherein the first set of virtual receivers and second set of virtual receivers are mutually exclusive.

14. The method of claim 8, wherein the first set of virtual receivers corresponds to signals received in a first frequency band and the second set of virtual receivers corresponds to signals received in a second, different frequency band.

15. A method for estimating direction of arrival in a MIMO radar system, the method comprising:
  generating a data cube having a plurality of cells, each cell representing directional radar data from one of a plurality of virtual receivers;
  selecting a first subset of the plurality of virtual receivers based upon empirically identifying an absence of self-interference for the first subset of the plurality of virtual receivers;
  generating a preliminary estimate of direction of arrival based on directional radar data from the first subset of the plurality of virtual receivers, using a first resolution applied to the data cube;
  using the preliminary estimate of direction of arrival to determine a region of interest within the directional radar data, wherein the region of interest corresponds to a portion of the data cube;
  applying a second resolution different from the first resolution to the portion of the data cube, without applying the second resolution to an entirety of the data cube; and
  estimating a direction of arrival using the directional radar data within the region of interest of the data cube, using the second resolution applied to the portion of the data cube, wherein the estimate of direction of arrival is associated with a second subset of the plurality of virtual receivers and is a refinement of the preliminary estimate.

16. The method of claim 15, wherein the second subset of the plurality of virtual receivers consist of virtual receivers.

17. The method of claim 15, wherein the second subset of the plurality of virtual receivers are virtual receivers different from the first subset of the plurality of virtual receivers.

18. The method of claim 15, wherein the second subset of the plurality of virtual receivers includes at least one virtual receiver of the first subset of the plurality of virtual receivers.

19. The method of claim 15, wherein the preliminary estimate of direction of arrival and the estimate of direction of arrival each represent two dimensions.

20. The method of claim 15, wherein the first subset of the plurality of virtual receivers corresponds to signals received in a first frequency band and the second subset of the plurality of virtual receivers corresponds to signals received in a second, different frequency band.

* * * * *